March 17, 1931.  E. A. CHAFFIN  1,797,073
WINDSHIELD WIPER
Filed Dec. 6, 1929    4 Sheets-Sheet 1
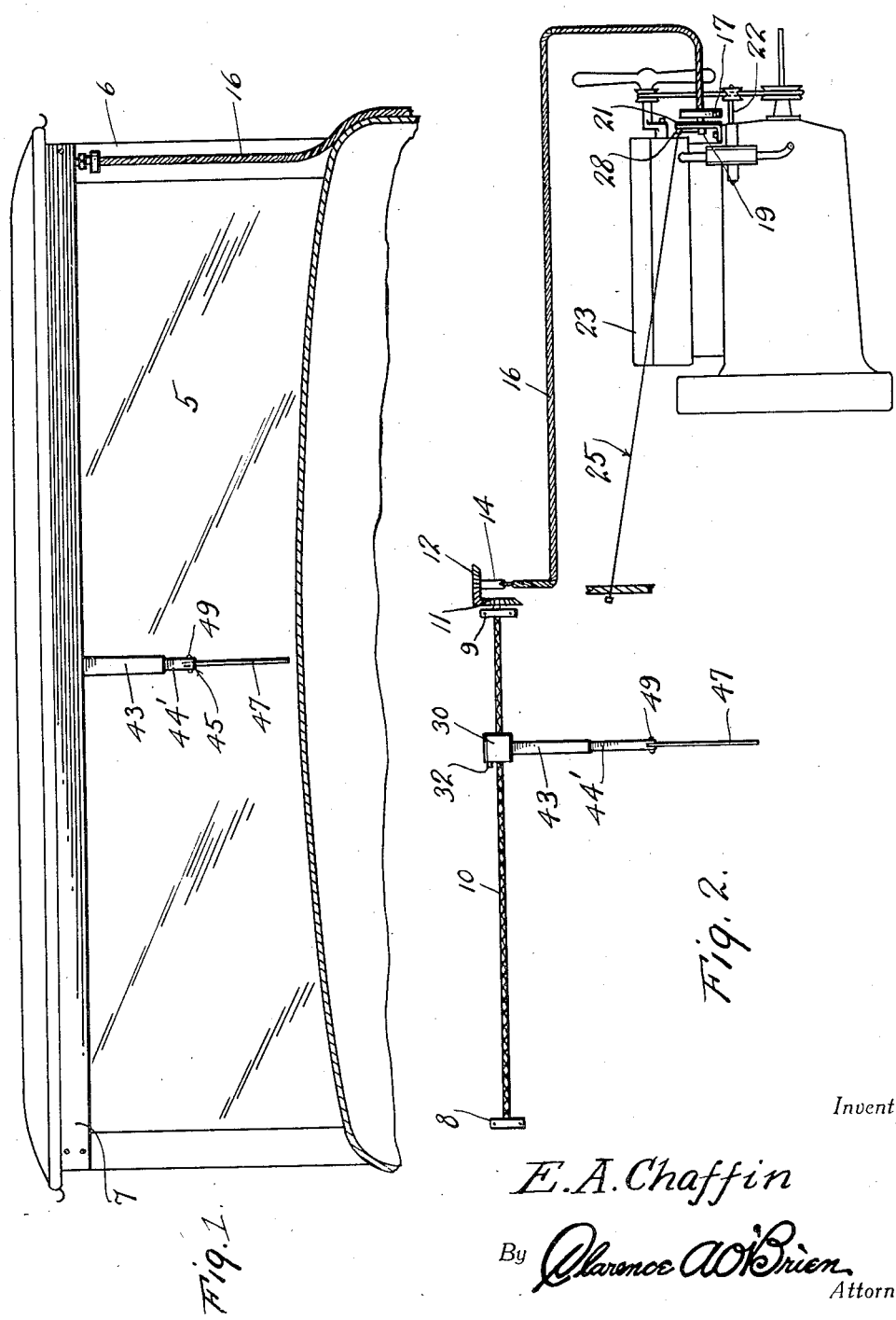
Inventor
E. A. Chaffin
By Clarence A. O'Brien
Attorney

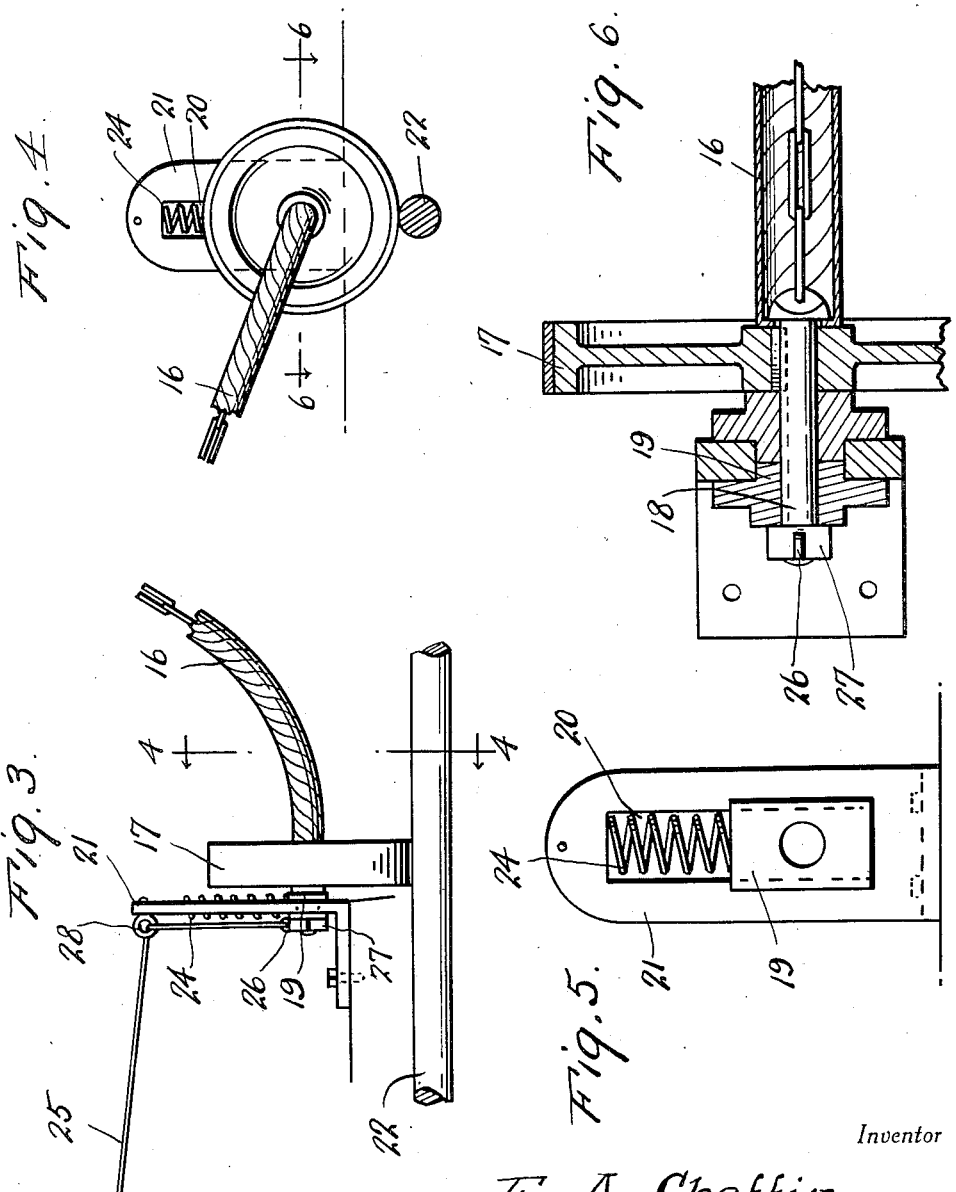

March 17, 1931.   E. A. CHAFFIN   1,797,073
WINDSHIELD WIPER
Filed Dec. 6, 1929   4 Sheets-Sheet 3
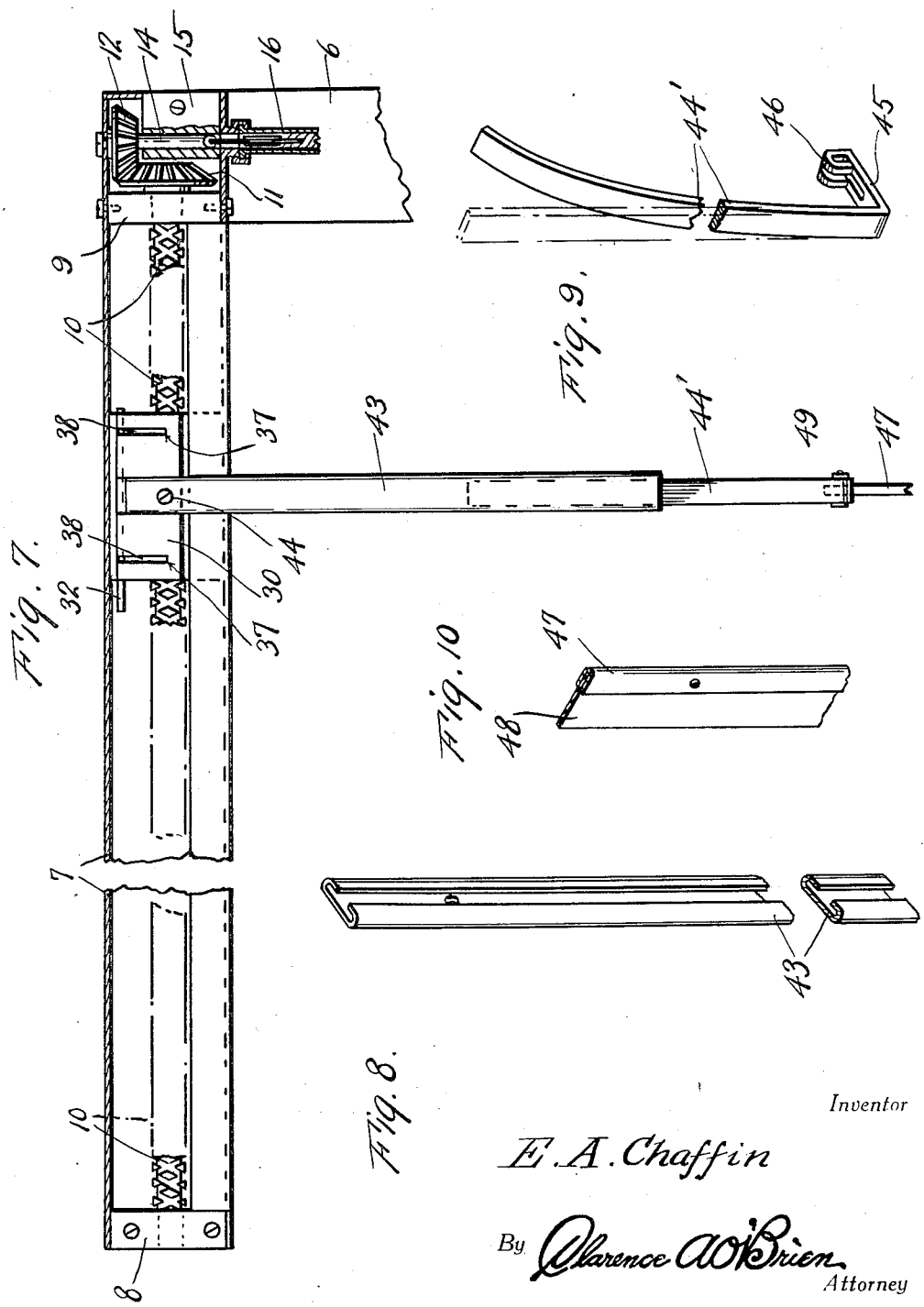
Inventor
E. A. Chaffin
By Clarence A. O'Brien
Attorney

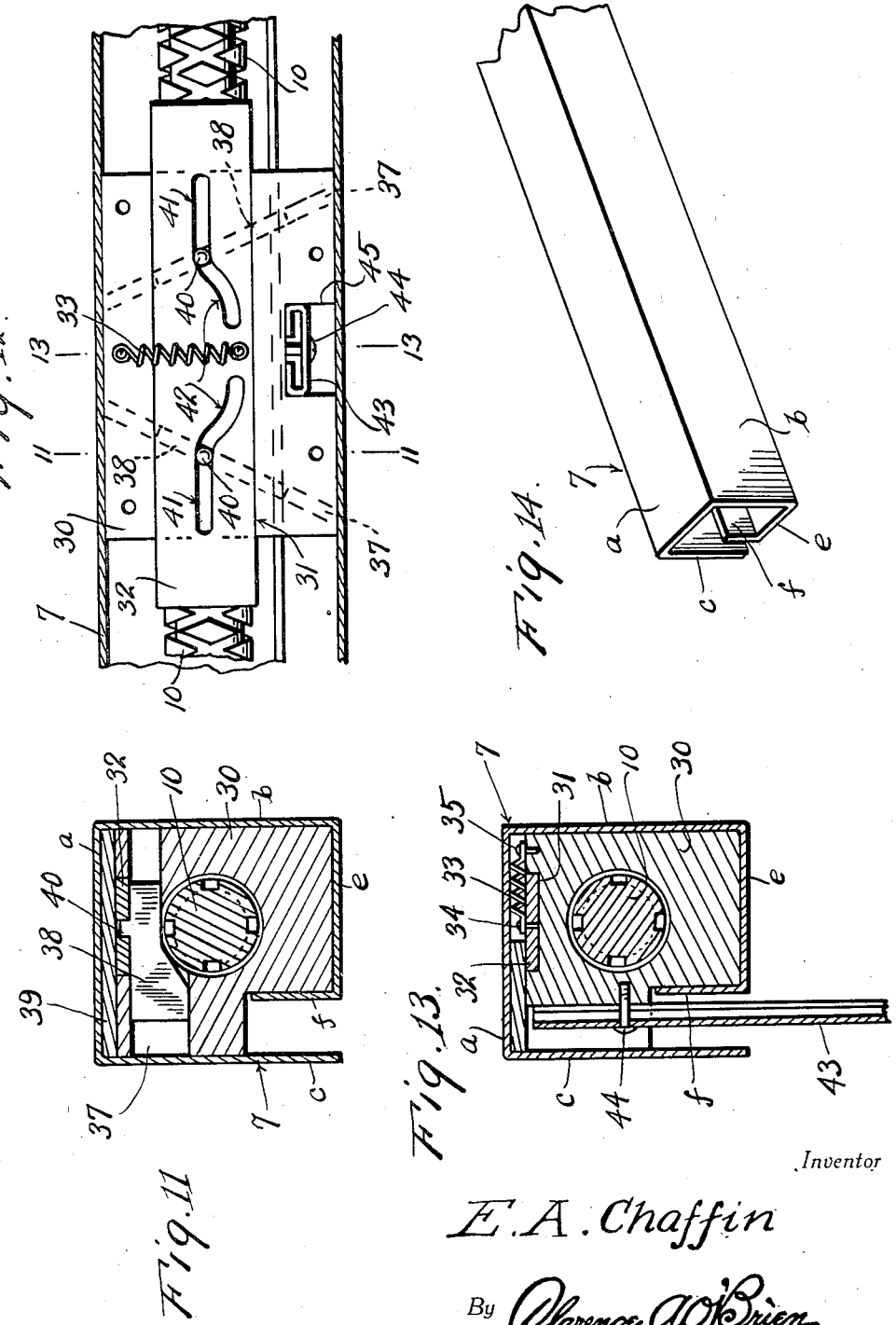

Patented Mar. 17, 1931

1,797,073

UNITED STATES PATENT OFFICE

ENCEL A. CHAFFIN, OF GAINESBORO, TENNESSEE

WINDSHIELD WIPER

Application filed December 6, 1929. Serial No. 412,134.

The present invention relates to a windshield wiper and has for its prime object to provide means for operating the wiper from rotatable part of the engine of the automobile.

Another very important object of the invention resides in the provision of a windshield wiper of this nature in which the squeegee moves the full length of the windshield from side to side.

Another very important object of the invention resides in the provision of a windshield wiping mechanism of this nature which is exceedingly simple in its construction, inexpensive to manufacture, strong and durable, not likely to easily become out of order, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is an outside elevation of a windshield showing my wiper mechanism associated therewith, Figure 2 is a diagrammatic view of the mechanism, Figure 3 is a side elevation of the power take off mechanism, Figure 4 is a sectional view therethrough substantially on the line 4—4 of Figure 3, Figure 5 is a detail view of the bracket, Figure 6 is a sectional view taken substantially on the line 6—6 of Figure 4, Figure 7 is a vertical sectional view through the casing, Figure 8 is a perspective view of one portion of the arm, Figure 9 is a perspective view of the other portion of the arm, Figure 10 is a perspective view of the squeegee, Figure 11 is a vertical transverse section taken substantially on the line 11—11 of Figure 12, Figure 12 is an enlarged detail horizontal section through the casing, Figure 13 is a vertical section taken substantially on the line 13—13 of Figure 12, and Figure 14 is a perspective view of a portion of the casing.

Referring to the drawing in detail it will be seen that the numeral 5 denotes a windshield mounted on a frame 6. An elongated casing 7 is mounted across the top of the windshield to the outer side thereof.

This casing 7 comprises a top wall $a$, a rear wall $b$ depending therefrom, a front wall $c$ depending therefrom, and a bottom wall $e$ extending forwardly from the rear wall and terminating short of the front wall $c$ and merging into a rising flange $f$.

Bearings 8 and 9 are mounted in the end portion of the casing and have journaled therein a shaft 10 provided with opposed thread grooves throughout its length. The end of the shaft journaled in the bearing 9 extends slightly therethrough and has a beveled gear 11 thereon meshing with the beveled gear 12 on a shaft 14 journaled in a bearing 15 mounted in the end of the casing and to this shaft section 14 is attached flexible casting 16 leading to a power take off mechanism.

This power take off mechanism comprises a tired wheel 17 on the end portion of the flexible casting which is in the form of a shaft section 18 journalled in a two part bearing which is vertically slidable in a slot 20 formed in an L-shaped bracket 21 secured in any suitable manner on the engine block or the like so that the rubber tired wheel 17 may engage the pump shaft 22 or any other rotating part of the internal combustion engine 23 such as is usually utilized in automobiles.

A spring 24 is mounted in the upper portion of the slot 22 to press downwardly on the bearing 19 thereby normally holding the wheel 17 in engagement with the shaft 22.

A cable 25 is engaged with the shaft section 18 by means of an eye 26 formed on the nut 27 threaded on the shaft section 18 to hold the bearing section together. This cable is trained through an eye bolt 28 on the upper end of the bracket and is extended up to a convenient place for the chauffeur or operator of the automobile to actuate.

Thus when the cable 25 is pulled, the wheel 17 is disengaged thereby placing the windshield wiper in an inoperative position.

A block 30 is slidable in the casing 7 and the upper front portion thereof slightly overhangs the upper edge of the flange f. A groove 31 is formed in the upper surface of the block 30 and the slide plate 32 is mounted therein.

A spring 33 is anchored as at 34 on the slide plate and as at 35 on the upper surface of the block 30 and normally holds the slide plate 32 in its various positions as will become apparent as the description proceeds.

A pair of recesses 37 are formed in the top portion of the block or carriage 30 and house diagonally disposed dogs 38 which converge forwardly toward each other. A cover 39 is disposed over the block or carriage 30 to hold the slide plates in place.

Lugs 40 rise in the upper edges of the dogs 38 to extend into longitudinally extending slots 41 formed in the plate 32 and the adjacent ends of these slots are curved to be offset as is indicated at 42.

An arm section 43 is secured as at 44 in a recess 45 formed in the overhanging front extension of the block 30 and depends therefrom and telescopically receives a normally curved resilient section 44' which is straightened out when in the section 43 thereby frictionally holding itself in proper adjusted position depending upon the length of arm desired.

The lower end of the section 44' has a right angularly disposed extension 45 which is bifurcated and formed with a pair of apertured ears 46 to receive therebetween frame 47 of squeegee 48 and, of course, a pivot pin 49 extends through the ears 46 and the frame 47.

When rotary motion is being imparted to the flexible shaft 16, the shaft 10 is being rotated. Presuming that the left hand lug 40 is in the curved portion 42 of its respective slot 41 it will be seen that the left hand dog is engaging the threads of the shaft 10 so as to move the block or carriage 30 to the left, and when the carriage arrives at the extreme left hand end of the frame the extension plate 32 abuts the left hand bearing 8 thereby shifting this plate and causing the right hand dog to be engaged with the threads of the shaft 10 and the release of the left hand dogs so that the carriage may be moved back to the right.

Thus it will be seen that the carriage reciprocates to and fro the windshield and causes the squeegee to wipe the windshield at the same time.

Obviously the squeegee may be adjusted up and down as may be desired depending, of course, on the make of the automobile and also on the height of the operator.

It is thought that the construction, operation, utility and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A windshield wiper of the character described comprising a housing, a shaft rotatably mounted in the housing having oppositely extending spiral grooves therein, means for rotating the shaft, a carriage slidably mounted in the housing, means for operatively coupling the carriage to the shaft for reciprocatory actuation thereby comprising a plate slidably mounted on the carriage having a pair of cam slots therein, a pair of dogs slidably mounted in the carriage for engagement in the spiral grooves of the shaft, and lugs formed on the dogs and projecting into the cam slots in a manner to operatively connect the dogs to the plate for actuation thereby, and a squeegee mounted on the carriage.

2. A windshield wiper of the character described comprising an elongated housing, bearing blocks mounted in the opposite end portions of the housing, a shaft rotatably mounted in the bearing blocks having oppositely extending spiral grooves therein, means for rotating the shaft, a carriage slidably mounted in the housing having an opening therethrough for the passage of the shaft, means for operatively coupling the carriage to the shaft for reciprocatory actuation thereby, said means comprising an elongated plate slidably mounted on the carriage and having its opposite end projecting beyond the carriage for engagement with bearing blocks for actuation thereby, said plate being further provided with a pair of cam slots, a pair of dogs mounted diagonally in the carriage for reciprocatory movement for alternately engaging the spiral grooves in the shaft, lugs formed on the dogs disposed in the cam slots to couple said dogs to the plate for actuation thereby, a contractile coil spring connecting the plate to the carriage tending to hold the plate in an adjusted position and a squeegee mounted on the carriage.

In testimony whereof I affix my signature.

ENCEL A. CHAFFIN.